United States Patent
Lagler et al.

(10) Patent No.: US 12,451,976 B2
(45) Date of Patent: Oct. 21, 2025

(54) METHOD AND APPARATUS FOR AN ACCURATE DETERMINATION OF A TRANSFER FUNCTION OF A DEVICE UNDER TEST

(71) Applicant: Rohde & Schwarz GmbH & Co. KG, Munich (DE)

(72) Inventors: Andreas Lagler, Rosenheim (DE); Florian Ramian, Karlsfeld (DE); Florian Gerbl, Olching (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 399 days.

(21) Appl. No.: 18/134,014

(22) Filed: Apr. 12, 2023

(65) Prior Publication Data

US 2024/0348345 A1    Oct. 17, 2024

(51) Int. Cl.
*H04B 17/00* (2015.01)

(52) U.S. Cl.
CPC .................. *H04B 17/0082* (2013.01)

(58) Field of Classification Search
CPC  H04B 17/00; H04B 17/0082; H04B 17/0085; H04B 17/14; H04B 17/18; H04B 17/26; H04B 17/296
See application file for complete search history.

(56) References Cited

U.S. PATENT DOCUMENTS

| | | | |
|---|---|---|---|
| 6,405,147 B1* | 6/2002 | Fera | H04B 1/62 702/182 |
| 7,054,358 B2* | 5/2006 | Yamaguchi | G01R 31/31709 375/226 |
| 9,667,358 B2* | 5/2017 | Baney | H04B 17/11 |
| 2010/0208785 A1 | 8/2010 | Lindqvist et al. | |

FOREIGN PATENT DOCUMENTS

| | | |
|---|---|---|
| FR | 2 285 619 A1 | 4/1976 |
| JP | H09257844 A | 10/1997 |
| JP | 2020-125917 A | 8/2020 |

* cited by examiner

*Primary Examiner* — Tuan Pham
(74) *Attorney, Agent, or Firm* — Westman, Champlin & Koehler, P.A.

(57) ABSTRACT

An apparatus and a method for accurate determination of a transfer function of a device under test (DUT) comprising a measurement unit adapted to measure a transfer function of the device under test (DUT) across a frequency range in response to a wideband signal applied by the measurement unit to the device under test (DUT), a preprocessing unit adapted to cut out data of the measured transfer function at frequencies where the applied wideband signal comprises a low spectral power density and a data processing unit adapted to process the remaining data of the measured transfer function to determine an accurate transfer function of said device under test (DUT).

18 Claims, 2 Drawing Sheets

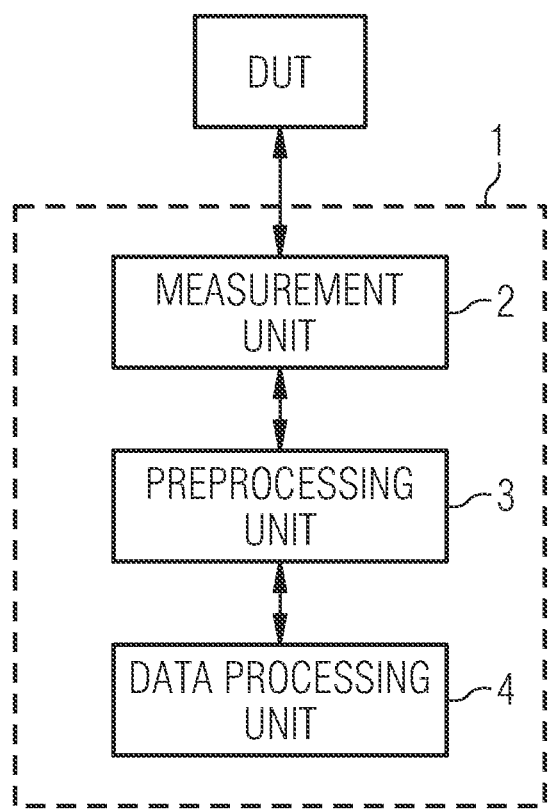
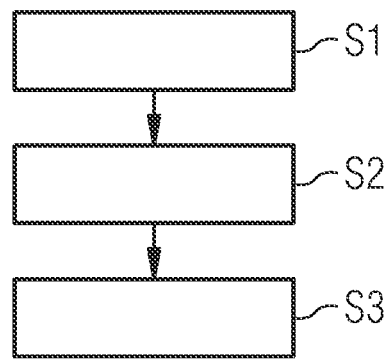

METHOD AND APPARATUS FOR AN ACCURATE DETERMINATION OF A TRANSFER FUNCTION OF A DEVICE UNDER TEST

TECHNICAL FIELD

The invention relates to a method and apparatus for an accurate determination of a transfer function of a device under test (DUT) such as an electronic device.

TECHNICAL BACKGROUND

Characteristics of a device under test or measurement object are indicated by its transfer function. Such a device can for instance be an electrical circuit comprising one or more ports. The device might be a single port device such as an antenna or a two port device such as an filter or amplifier. The investigated device may also comprise several ports. In a conventional setup a transfer function TF is measured using a test signal applied to an input port of the respective device under test DUT. However, such a test signal may differ to a large extent from a signal which is applied to the input port of the respective device during its normal operation. Consequently, it cannot be excluded that the device under test DUT will behave differently in its normal operation environment where it receives another kind of signal at its input port than the test signal.

Accordingly, it is desired to use a signal as a stimulation signal for measurement of a transfer function TF of the investigated device which corresponds to a signal applied during normal operation to this device. However, such a signal may comprise a power spectral density PSD which is not constant and which can be quite low at some frequencies of the applied test frequency range. This in turn decreases the measurement certainty and measurement accuracy when measuring the transfer function TF of the device under test. The measurement certainty can be frequency dependent and can be dependent from the power spectral density PSD of the applied signal. If a measured spectrum data set is evaluated in relation to an applied reference spectrum data set a low power spectral density PSD at a specific frequency increases significantly the measurement uncertainty as also illustrated in FIGS. 4, 5. Therefore there exists a need to provide a method and apparatus which allow to measure a transfer function of a device under test using as a test signal a signal which is applied to the device during its normal operation while providing a high measurement accuracy.

SUMMARY

The invention provides according to a first aspect a method for an accurate determination of a transfer function of a device under test comprising the steps of:
measuring a transfer function of the device under test across a frequency range in response to a wideband signal applied to the device under test;
removing data of the measured transfer function at frequencies where the applied wideband signal comprises a low power spectral density; and
processing remaining data of the measured transfer function to determine an accurate transfer function of said device under test.

In possible embodiment of the method for an accurate determination of a transfer function of a device under test by removing data of the measured transfer at frequencies where the applied wideband signal comprises a low power spectral density gaps in the measured transfer function are formed which are closed by data interpolation on the basis of the remaining—not removed—data.

In possible embodiment of the method for an accurate determination of a transfer function of a device under test the employed data interpolation comprises a linear interpolation, a polynomial interpolation or a spline interpolation. In a possible embodiment of the method for an accurate determination of a transfer function of a device under test the remaining data of the measured transfer function is interpolated to determine the accurate transfer function of said device under test.

In a possible embodiment of the method the data of the measured transfer function is stored in a first data memory.

In a possible embodiment of the method the data of the derived accurate transfer function is stored in a second data memory In a possible embodiment of the method for an accurate determination of a transfer function of a device under test the applied wideband signal is a reference signal generated by a reference signal source.

In a possible embodiment of the method for an accurate determination of a transfer function of a device under test the power spectral density of the applied wideband signal is determined.

In a possible embodiment of the method for an accurate determination of a transfer function of a device under test the wideband signal comprises a predefined reference signal having an associated characteristic power spectral density.

In a possible embodiment of the method for an accurate determination of a transfer function of a device under test the power spectral density of the applied wideband signal is compared with a threshold value to identify frequencies where the applied wideband signal comprises a low power spectral density.

In a possible embodiment of the method for an accurate determination of a transfer function of a device under test the power spectral density of the applied wideband signal is stored in a third data memory.

In a possible embodiment of the method for an accurate determination of a transfer function of a device under test the wideband signal applied to the device under test comprises a signal applied to the device under test during its normal operation.

In a possible embodiment of the method for an accurate determination of a transfer function of a device under test the wideband signal applied to the device under test comprises a modulated signal.

The invention provides according to a further aspect an apparatus for accurate determination of a transfer function of a device under test comprising:
a measurement unit adapted to measure a transfer function of the device under test across a frequency range in response to a wideband signal applied by the measurement unit to the device under test;
a preprocessing unit adapted to remove data of the measured transfer function at frequencies where the applied wideband signal comprises a low spectral power density; and
a data processing unit adapted to process remaining data of the measured transfer function to determine an accurate transfer function of said device under test, In a possible embodiment of the apparatus for accurate determination of a transfer function of a device under test the data processing unit of the apparatus is adapted to interpolate the remaining data of the transfer function measured by the measurement unit to determine the accurate transfer function of said device under test.

In a possible embodiment of the apparatus for accurate determination of a transfer function of a device under test the preprocessing unit of the apparatus comprises a comparator adapted to compare a power spectral density of the applied wideband signal with a threshold value to identify frequencies where the applied wideband signal comprises a low power spectral density.

In a possible embodiment of the apparatus for accurate determination of a transfer function of a device under test further comprises a graphical user interface adapted to display the measured transfer function and/or the determined accurate function and/or the power spectral density of the wideband signal applied to the device under test.

In a possible embodiment of the apparatus for accurate determination of a transfer function of a device under test further comprises a data interface adapted to transmit the measured transfer function and/or the determined accurate function and/or the power spectral density of the wideband signal applied to the device under test. In a possible embodiment of the apparatus for accurate determination of a transfer function of a device under test the threshold value used to identify frequencies where the applied wideband signal comprises a low power spectral density is supplied to the comparator of the preprocessing unit by a graphical user interface or by a data interface of the apparatus.

BRIEF DESCRIPTION OF FIGURES

In the following possible embodiments of the different aspects of the present invention are described in more detail with reference to the enclosed Figures.

FIG. 1 shows a block diagram of an exemplary embodiment of apparatus for accurate determination of a transfer function of a device under test;

FIG. 2 shows a flow chart of a possible embodiment of a method for an accurate determination of a transfer function of a device under test;

DETAILED DESCRIPTION OF EMBODIMENTS

Figure 3:
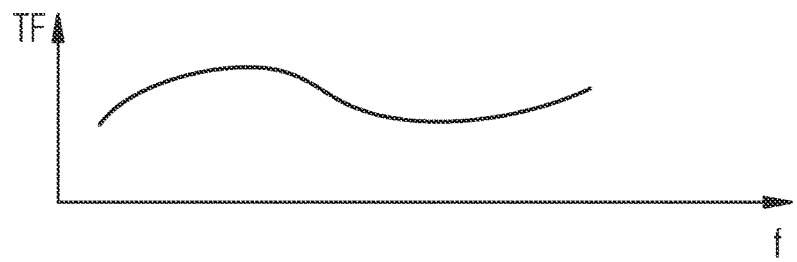
FIGS. 3 to 7 show diagrams for illustrating the operation of a method and apparatus according to the present invention.

FIG. 1 shows a block diagram of an exemplary embodiment of apparatus 1 for accurate determination of a transfer function of a device under test DUT connected to a port of the apparatus 1. The device under test DUT may comprise for instance a transfer function TF such as shown in FIG. 3.

Figure 5:
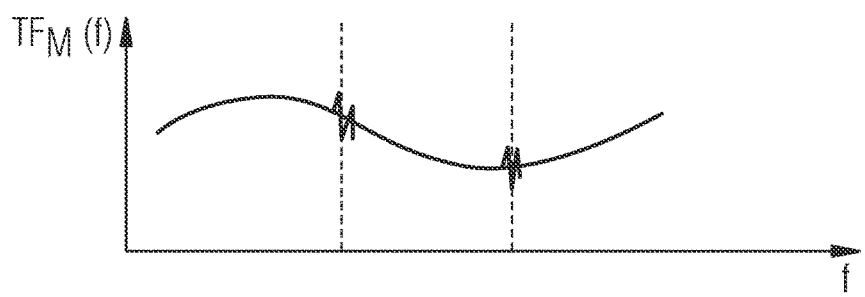

The apparatus 1 comprises a measurement unit 2 adapted to measure a transfer function TF (f) of the device under test DUT across a predefined frequency range in response to a wideband signal applied by the measurement unit 2 to the connected device under test DUT as illustrated in FIG. 5.

The apparatus 1 further comprises a preprocessing unit 3 adapted to remove data of the measured transfer function TF (f) of FIG. 5 at frequencies f where the applied wideband signal comprises a low power spectral density. In a possible implementation data of the measured transfer function TF (f) can be removed by cutting-out data or by cancelling data at those frequencies where the applied wideband signal comprises a low spectral power density. The removed data can comprise one or more data samples of the measured transfer function TF (f). The preprocessing unit 3 can comprise a comparator adapted to compare a power spectral density, PSD, of the applied wideband signal with a threshold value PSD-TH to identify frequencies such as frequencies f1, f2 illustrated in FIG. 4 where the applied wideband signal comprises a low power spectral density. The Power Spectral Density PSD is the measure of a signal's power content versus frequency f. The power spectral density of a signal indicates the distribution of signal power over a frequency range.

Figure 6:
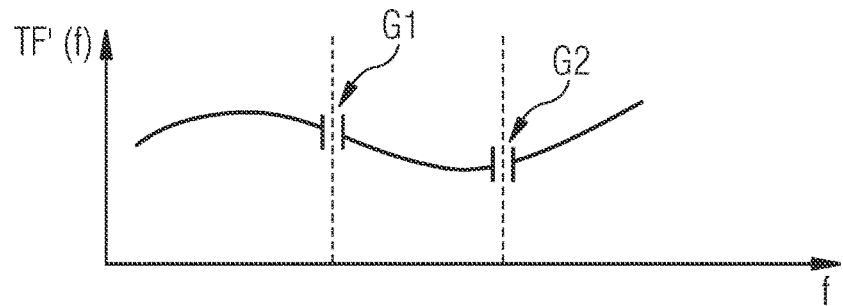
Figure 7:
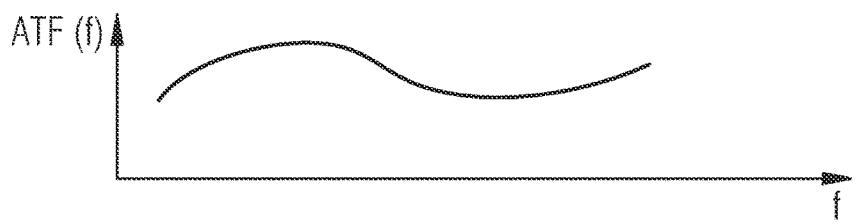

The apparatus 1 further comprises in the embodiment shown in FIG. 1 a data processing unit 4 adapted to process remaining data of the measured transfer function TF (f) as shown in FIG. 6 to determine an accurate transfer function ATF (f) of said device under test DUT as illustrated in FIG. 7. In a possible embodiment of the apparatus 1 the data processing unit 4 is adapted to interpolate the remaining data of the transfer function measured by the measurement unit 2 to determine the accurate transfer function ATF (f) of the device under test DUT.

Figure 4:
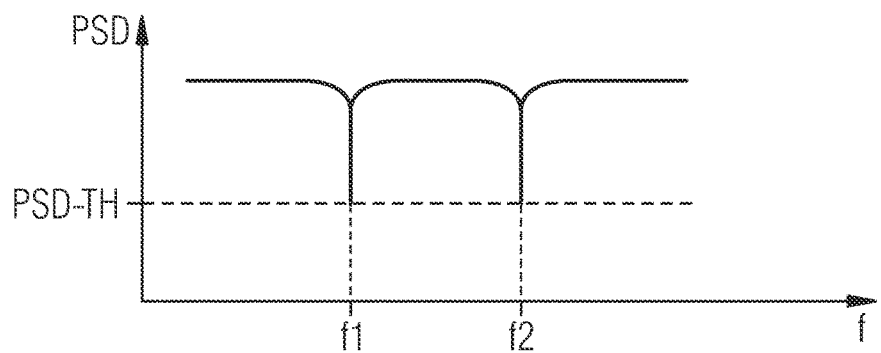

In a possible embodiment of the apparatus 1 for accurate determination of a transfer function of a device under test DUT further comprises a graphical user interface GUI adapted to display a measured transfer function TF (f) such as illustrated in FIG. 5 and/or to display a determined accurate function ATF (f) such as illustrated in FIG. 7 and/or to display a power spectral density, PSD, such as illustrated in FIG. 4, of the wideband signal applied to the device under test DUT. In a possible embodiment a user may adjust the applied PSD threshold value PSD-TH at the displayed PSD spectrum shown in FIG. 4 by shifting the displayed PSD-TH level on the GUI in vertical direction while observing the displayed measured transfer function TF (f) of FIG. 5.

In a possible embodiment the apparatus 1 can also comprise a data interface adapted to transmit the measured transfer function TF (f) and/or the determined accurate function ATF (f) and/or the power spectral density, PSD, of the wideband signal applied to the device under test (DUT) to a controller. The threshold value PSD-TH used to identify frequencies f where the applied wideband signal comprises a low power spectral density PSD can in a possible implementation be supplied to the comparator of the preprocessing unit 3 of the apparatus 1 by the graphical user interface GUI or by the data interface of the apparatus 1.

FIG. 2 shows a flow chart of a possible embodiment of a method for an accurate determination of a transfer function of a device under test DUT. The method comprises in the illustrated embodiment three main steps S1, S2, S3.

In a first step S1 a transfer function TF of the device under test DUT across a frequency range is measured by the measurement unit 2 of the apparatus 1 in response to a wideband signal applied by the measurement unit 2 to the device under test DUT. In a possible embodiment of the method the wideband signal applied by the measurement unit 2 to the device under test DUT comprises a reference signal generated by a reference signal source of the measurement unit 2.

The applied wideband signal can be a signal which is identical with or at least similar to a signal applied during normal operation to the investigated device. In a possible embodiment of the method the data of the transfer function TF (f) measured in step S1 can be stored at least temporarily in a first data memory of the apparatus 1. FIG. 5 shows an example of a transfer function TF (f) measured by the measurement unit 2 using an applied wideband signal having a power spectral density PSD as illustrated in FIG. 4. As can be seen in the example of FIG. 4 the power spectral density PSD of the applied wideband signal used in step S1 is low at frequencies f1, f2. This leads to unwanted measurement uncertainties in the measured transfer function TF (f) at these frequencies f1, f2 as illustrated in FIG. 5.

In a second step S2 of the method illustrated in FIG. 2 data of the transfer function TF (f) measured in step S1 and stored in the first data memory is removed by the preprocessing unit 3 of the apparatus 1 at those frequencies f1, f2 where the wideband signal applied by the measurement unit 2 of the apparatus 1 to the device under test DUT comprises a low power spectral density. The remaining data can be stored at least temporarily in a second data memory of the apparatus 1 as illustrated in FIG. 6. The remaining data set comprises minor data gaps G1, G2 at the frequencies f1, f2 as can be seen in FIG. 6. The extent of the data gaps G or the number of missing removed data samples can in possible embodiment be varied depending on the power spectral density PSD at the critical frequencies f1, f2. The user may adjust also the extent of the displayed data gaps G using the GUI of the apparatus 1.

In a third step S3 of the method illustrated in FIG. 2 the remaining data, i.e., the not cut-out data, of the measured transfer function TF (f) stored in the second memory is processed by the data processing unit 4 of the apparatus 1 to determine an accurate transfer function ATF (f) of the device under test DUT. In a preferred embodiment the data values of the remaining not removed data samples of the measured transfer function TF (f) stored at least temporarily in the first data memory are interpolated in step S3 by the data processing unit 4 to close the data gaps G and to determine a smooth and accurate transfer function ATF (f) of the device under test DUT stored in a second data memory as illustrated in FIG. 7 which does correspond to the real transfer function TF of the device illustrated in FIG. 3. For instance, the gaps G1, G2 shown in FIG. 6 can be closed by data interpolation in step S3.

Interpolation comprises a calculation process where known data values are used to estimate unknown data values. Interpolation refers to a process of constructing (finding) new data points based on the range of a discrete set of known data points. There are different suited interpolation techniques. For example, linear interpolation requires knowledge of only two data points and a constant rate of change between them. Linear interpolation uses a linear function for each interval or gap G. Polynomial interpolation is a generalization of linear interpolation.

Polynomial interpolation replaces the linear function with a polynomial function of higher degree. Spline interpolation uses low-degree polynomials in each of the intervals, and chooses the polynomial pieces such that they fit smoothly together. The resulting function is called a spline. Other interpolation techniques can be used in alternative embodiments.

In a possible embodiment an interpolation technique employed for closing the gaps G can be selected by a user or depending on a width of the gaps.

The method illustrated in FIG. 2 can be applied to any kind of frequency dependent transfer functions TF (f) including amplitude transfer functions and phase transfer functions.

In a possible embodiment of the method a power spectral density PSD of the applied wideband signal is determined. In a possible embodiment of the method the determined power spectral density, PSD, of the applied wideband signal can be stored in a third data memory of the apparatus 1. In an alternative embodiment the applied wideband signal can comprise a predefined reference signal having an associated characteristic power spectral density which may be read from a configuration memory.

In a possible embodiment of the method for an accurate determination of a transfer function TF of a device under test DUT as shown in FIG. 2 the power spectral density PSD of the applied wideband signal is compared by a comparator of the preprocessing unit 3 in step S2 with a PSD-threshold value PSD-TH to identify frequencies f where the applied wideband signal comprises a low power spectral density. The PSD-threshold value used by the comparator of the preprocessing unit 3 of the apparatus 1 can in a possible implementation be set by a user for instance by means of a graphical user interface GUI of the apparatus 1. The PSD-threshold value PSD-TH used by the comparator of the preprocessing unit 3 of the apparatus 1 can also comprise a predefined threshold value read from a configuration memory. The PSD-threshold value PSD-TH can also be received by a data interface of the apparatus 1 from a remote controller or even from the device under test DUT itself. The method according to the present invention can be implemented as a computer program or as a software tool. It can be used for different frequency ranges corresponding to the frequency range used by the device under test in its normal operation environment.

In a preferred embodiment of the method and apparatus according to the present invention the wideband signal applied to the device under test DUT comprises a signal which is applied to the device under test DUT by a signal source also during its normal operation. For instance, the wideband signal applied to the device under test DUT may comprises a modulated signal applied by a signal source to the device under test DUT also in its normal operation environment.

The invention claimed is:

1. A method for an accurate determination of a transfer function of a device under test (DUT) comprising the steps of:
   measuring a transfer function of the device under test across a frequency range in response to a wideband signal applied to the device under test;
   removing data of the measured transfer function at frequencies where the applied wideband signal comprises a low power spectral density; and
   processing remaining data of the measured transfer function to determine an accurate transfer function of said device under test.

2. The method according to claim 1,
   wherein removing data of the measured transfer function at frequencies where the applied wideband signal comprises a low power spectral density forms gaps in the measured transfer function closed by data interpolation on the basis of the remaining not removed data.

3. The method according to claim 2,
   wherein the data interpolation comprises a linear interpolation, a polynomial interpolation or a spline interpolation.

4. The method according to claim 3,
   wherein the remaining data of the measured transfer function is interpolated to determine the accurate transfer function of said device under test.

5. The method according to claim 1,
   wherein the data of the measured transfer function is stored in a first data memory and wherein the data of the derived accurate transfer function is stored in a second data memory.

6. The method according to claim 1,
   wherein the applied wideband signal is a reference signal generated by a reference signal source.

7. The method according to claim 1, wherein the power spectral density of the applied wideband signal is determined.

8. The method according to claim 1, wherein the applied wideband signal comprises a predefined reference signal having an associated characteristic power spectral density.

9. The method according to claim 1, wherein the power spectral density of the applied wideband signal is compared with a threshold value to identify frequencies where the applied wideband signal comprises a low power spectral density.

10. The method according to claim 1, wherein the power spectral density of the applied wideband signal is stored in a third data memory.

11. The method according to claim 1, wherein the wideband signal applied to the device under test comprises a signal applied to the device under test during its normal operation.

12. The method according to claim 9, wherein the wideband signal applied to the device under test comprises a modulated signal.

13. An apparatus for accurate determination of a transfer function of a device under test comprising:
a measurement unit adapted to measure a transfer function of the device under test across a frequency range in response to a wideband signal applied by the measurement unit to the device under test;
a preprocessing unit adapted to remove data of the measured transfer function at frequencies where the applied wideband signal comprises a low spectral power density; and
a data processing unit adapted to process remaining data of the measured transfer function to determine an accurate transfer function of said device under test.

14. The apparatus for accurate determination of a transfer function of a device under test according to claim 11, wherein the data processing unit is adapted to interpolate the remaining data of the transfer function measured by the measurement unit to determine the accurate transfer function of said device under test.

15. The apparatus for accurate determination of a transfer function of a device under test according to claim 11, wherein the preprocessing unit comprises a comparator adapted to compare a power spectral density of the applied wideband signal with a threshold value to identify frequencies where the applied wideband signal comprises a low power spectral density.

16. The apparatus for accurate determination of a transfer function of a device under test according to claim 11 further comprising a graphical user interface adapted to display the measured transfer function and/or to display the determined accurate function and/or to display the power spectral density of the wideband signal applied to the device under test.

17. The apparatus for accurate determination of a transfer function of a device under test according to claim 11 further comprising a data interface adapted to transmit the measured transfer function and/or the determined accurate function and/or the power spectral density of the wideband signal applied to the device under test to a controller.

18. The apparatus for accurate determination of a transfer function of a device under test according to claim 13, wherein the threshold value used to identify frequencies where the applied wideband signal comprises a low power spectral density is supplied to the comparator of the preprocessing unit by a graphical user interface or by a data interface of the apparatus.

* * * * *